(12) United States Patent
Gandhi

(10) Patent No.: US 12,432,213 B2
(45) Date of Patent: *Sep. 30, 2025

(54) ACCESS CONTROL LISTS RULES REDUCTION

(71) Applicant: Microsoft Technology Licensing, LLC, Redmond, WA (US)

(72) Inventor: Rohan Gandhi, Maharashtra (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/748,821

(22) Filed: Jun. 20, 2024

(65) Prior Publication Data

US 2024/0414164 A1 Dec. 12, 2024

Related U.S. Application Data

(63) Continuation of application No. 17/830,181, filed on Jun. 1, 2022, now Pat. No. 12,047,380.

(51) Int. Cl.
*H04L 9/40* (2022.01)

(52) U.S. Cl.
CPC ........ *H04L 63/101* (2013.01); *H04L 63/0236* (2013.01); *H04L 63/0263* (2013.01); *H04L 63/102* (2013.01); *H04L 63/20* (2013.01)

(58) Field of Classification Search
CPC .... H04L 63/101; H04L 63/20; H04L 63/0236
See application file for complete search history.

(56) References Cited

U.S. PATENT DOCUMENTS

| | | | |
|---|---|---|---|
| 5,581,390 A * | 12/1996 | Fielden | H04B 7/1856 398/115 |
| 7,007,032 B1 * | 2/2006 | Chen | G06F 7/22 707/693 |
| 7,904,642 B1 * | 3/2011 | Gupta | G06F 16/90339 711/108 |
| 10,778,721 B1 * | 9/2020 | Holbrook | H04L 63/20 |
| 2010/0199346 A1 * | 8/2010 | Ling | H04L 63/0263 726/12 |
| 2012/0096220 A1 * | 4/2012 | Liu | H04L 47/2441 711/108 |
| 2016/0191466 A1 * | 6/2016 | Pernicha | H04L 63/20 726/1 |

(Continued)

*Primary Examiner* — William S Powers
(74) *Attorney, Agent, or Firm* — Ray Quinney & Nebeker P.C.; Tiffany B. Healy

(57) ABSTRACT

The present disclosure relates to methods and systems for reducing access control lists (ACLs). The methods and systems combine multiple allowed internet protocol (IP) addresses from the ACLs to a single or small number of IP prefixes. The methods and systems calculate a minimum of the bit changes in transforming the IP addresses from one to another. Using the information for the minimum bit changes in transforming the IP addresses from one to another, the methods and systems build a graph of IP addresses, where the nodes are the IP addresses, and the edges denote that the IP addresses are transformed from one to another using the minimum number of bit changes. The methods and systems recursively merge the nodes to reduce the ACL rules into a compressed ACL rule graph. The methods and systems generate a reduced set of ACL rules using the compressed ACL rule graph.

20 Claims, 10 Drawing Sheets

(56) References Cited

U.S. PATENT DOCUMENTS

| | | | |
|---|---|---|---|
| 2018/0205739 A1* | 7/2018 | Sommerfelt | G06F 21/6218 |
| 2019/0207907 A1* | 7/2019 | Savintsev | H04L 45/72 |
| 2022/0070282 A1* | 3/2022 | Sobhani | H04L 41/145 |
| 2023/0179583 A1* | 6/2023 | Bhagvath | H04L 63/0485 |
| | | | 713/151 |

* cited by examiner

ACCESS CONTROL LISTS RULES REDUCTION

CROSS REFERENCE TO RELATED APPLICATIONS

This application is a Continuation of U.S. application Ser. No. 17/830,181, filed Jun. 1, 2022, which is incorporated herein by reference in its entirety.

BACKGROUND

Access Control Lists (ACLs) are important for application security. ACL rules consist of allow and deny rules. The allow rules specify the IP addresses that have permission to access the applications, services, and/or machines. The deny rules specify the IP addresses that do not have permission to access the applications, services, and/or machines. There is a growing trend in organizations to add different applications or services to a same machine. The services may perform a control operation task to manage the machines or the data centers (e.g., data recovery). As such, multiple services are multiplexed on a single machine, resulting in a significant increase of ACLs on host machines.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving a plurality of access control list (ACL) rules that include a plurality of allow rules with allowed Internet Protocol (IP) addresses. The method includes calculating a minimum number of bit changes to transform one IP address of the allowed IP addresses to another IP address of the allowed IP addresses. The method includes generating an ACL rule graph with a plurality of nodes and a plurality of edges, wherein each node of the plurality of nodes corresponds a different IP addresses of the allowed IP addresses and each edge corresponds to the minimum numbers of bit changes between each node. The method includes identifying one or more nodes of the ACL rule graph to merge into a merged node. The method includes generating a compressed ACL rule graph with merged nodes. The method includes generating a reduced set of ACL rules based on the compressed ACL rule graph.

Some implementations relate to a device. The device includes one or more processors; memory in electronic communication with the one or more processors; and instructions stored in the memory, the instructions executable by the one or more processors to: receive a plurality of access control list (ACL) rules that include a plurality of allow rules with allowed Internet Protocol (IP) addresses; calculate a minimum number of bit changes to transform one IP address of the allowed IP addresses to another IP address of the allowed IP addresses; generate an ACL rule graph with a plurality of nodes and a plurality of edges, wherein each node of the plurality of nodes corresponds a different IP addresses of the allowed IP addresses and each edge corresponds to the minimum number of bit changes between each node; identify one or more nodes of the ACL rule graph to merge into a merged node; generate a compressed ACL rule graph with merged nodes; and generate a reduced set of ACL rules based on the compressed ACL rule graph.

Some implementations relate to a method. The method includes receiving a plurality of ACL rules that include a plurality of allow rules that identify allowed IP addresses for accessing one or more applications, services, or machines provided by a service provider. The method includes merging a pair of allow rules based on a minimum number of bit changes to transform one IP address of the allowed IP addresses to another IP address of the allowed IP addresses. The method includes generating a reduced set of ACL rules based on merging the pair of allow rules.

Some implementations relate to a device. The device includes one or more processors; memory in electronic communication with the one or more processors; and instructions stored in the memory, the instructions executable by the one or more processors to: receive a plurality of ACL rules that include a plurality of allow rules that identify allowed IP addresses for accessing one or more applications, services, or machines provided by a service provider; merge a pair of allow rules based on a minimum number of bit changes to transform one IP address of the allowed IP addresses to another IP address of the allowed IP addresses; and generate a reduced set of ACL rules based on merging the pair of allow rules.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
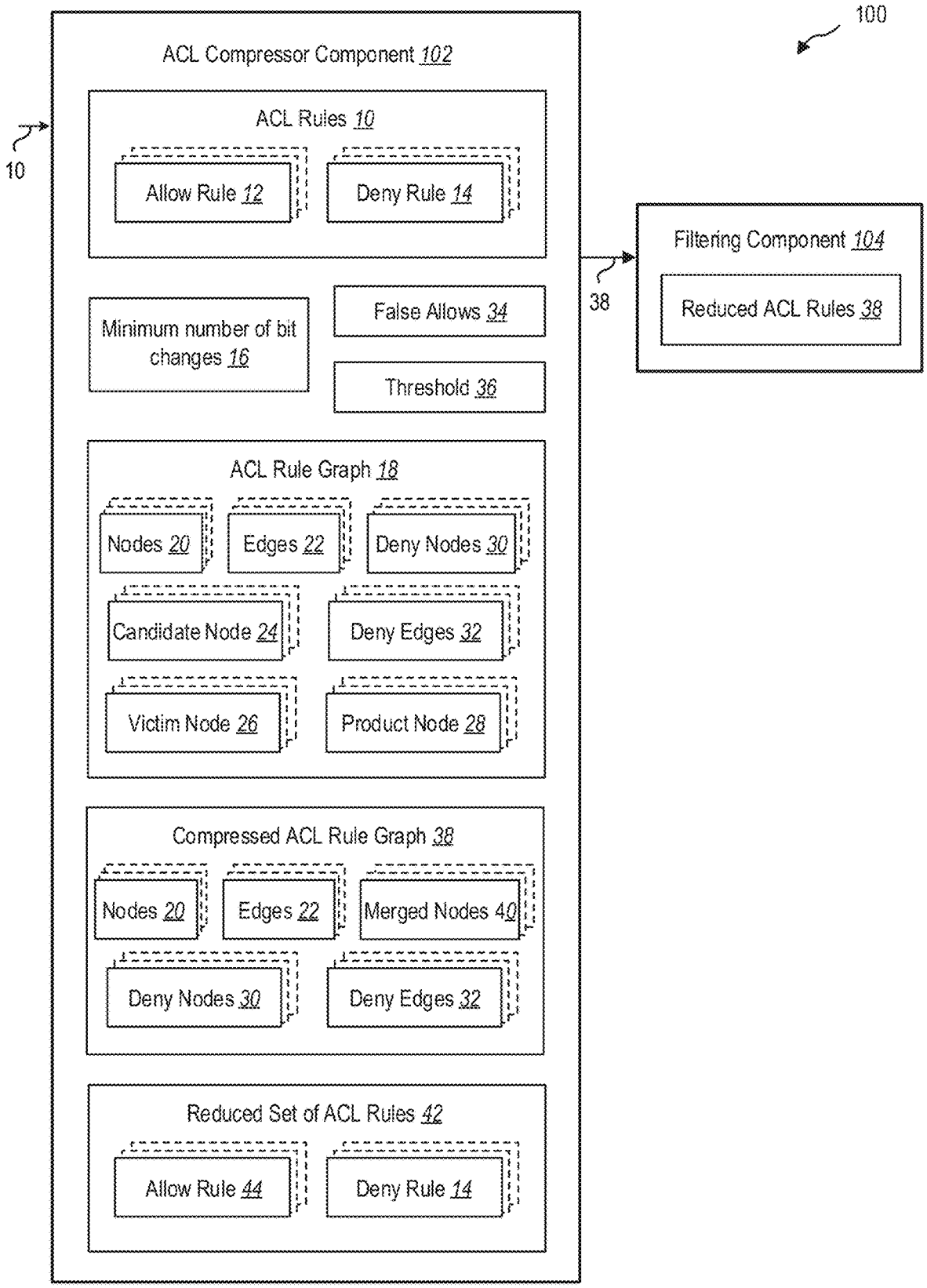
FIG. 1 illustrates an example environment for reducing ACL rules in accordance with implementations of the present disclosure.

This disclosure generally relates to access control lists (ACLs). ACLs are important for application security. Network ACLs protect machines of an organization from unauthorized access or malicious actors. The ACL rules consist of allow and deny rules.

The ACL rules may include allow ACL rules that specify the Internet Protocol (IP) addresses that have permission to access the applications, services, and/or machines provided by a service provider. The allow ACL rules may specify which IP addresses from an organization have permission to access the applications, services, and/or machines. For example, the organization may be the same as the service provider. The ACL rules may also specify which IP addresses from outside of an organization may access the organization's applications, services, and/or machines. An example of an allow rule is "allow 10.0.0.1" and the machine may be only accessed from devices that have an IP address of 10.0.0.1.

The ACL rules may also include deny rules that specify the IP addresses that do not have permission to access the applications, services, and/or the machines provided by a service provider. For example, the deny ACL rules may specify which devices from outside of an organization are blocked from accessing the organization's applications, services, and/or machines. In addition, the deny ACL rules may specify which devices within an organization are blocked from accessing the organization's applications, services, and/or machines. An example of a deny rule is "deny 10.0.0.0/24" and no device with an IP address in 10.0.0.0/24 subnet may have access to the applications, services, and/or machines. The set of ACL rules may be consistent across different applications, services, and/or machines within an organization. In addition, the set of ACL rules may be different for different applications, services, and/or machines.

Service owners may define a set of ACLs for the applications, services, and/or machines owned by the service owners. The set of ACLs may identify which IP addresses may access the applications, services, and/or machines provided by the service owners. The set of ACLs may be programmed into the virtual filtering platform (VFP) of the machines to filter the received network traffic based on the set of ACLs.

There is a growing trend in organizations to add different applications or services to a same machine. The services may perform a control operation task to manage the machines or the data centers (e.g., data recovery). As such, multiple services are multiplexed on a single machine, resulting in a significant increase of ACLs on host machines. For example, organizations may add 50 to 100 services on a single host machine and ACLs from all the services coexist on the single host machine programmed into the VFP. The VFP may have an increase up to 50 to 100 times the number of ACLs. Thus, as the number of ACLs increase on a host machine, the VFP throughput is reduced, resulting in a reduction of the VFP performance. For example, increasing the number of ACL rules by 20 times may reduce the lookup throughput of the VFP by 40 times.

The present disclosure provides methods and systems that reduce the number of ACL rules. The methods and systems combine multiple allowed IPs to a single or small number of IP prefixes. However, in doing so, the methods and systems may include a small number of IPs that are neither part of the explicit allow rules or deny rules, and thus, the security risk may be increased by including such additional IPs.

Each organization is allocated certain IP addresses (e.g., a range of IP addresses), if the additional IP addresses added to the ACL rules are within a range assigned to a same organization of the IP addresses included in the ACL rules, the security risk of adding the additional IP addresses may be minimized. Thus, the methods and systems keep the security risk bounded while reducing the ACL rules by ensuring that the additional IP addresses added to the ACL rules are within a same organization as the organization for the original ACL rules when merging the ACL IP addresses to smaller IP prefixes and providing additional IP addresses access.

One example use case includes three ACL allow rules for IP addresses within a same organization Rule 1 "allow 10.0.0.0," Rule 2 "allow 10.0.0.1," and Rule 3 "allow 10.0.0.3." The methods and systems may combine these three ACL allow rules into a single allow rule "allow 10.0.0.0/30." IP addresses are usually 32 bit and the new single allow rule is looking at 30 bits and ignoring the last two bits of the IP address, which provides a set of four IP addresses (1) "allow 10.0.0.0," (2) "allow 10.0.0.1," (3) "allow 10.0.0.2," and (4) "allow 10.0.0.3." In combining the three ACL allow rules into a single ACL allow rule, the IP address 10.0.0.2 is now included into the list of IP addresses allowed to access the machine or service. The IP address 10.0.0.2 belongs to the same organization as the three ACL allow rules, and thus, the security risk of including the IP address 10.0.0.2 into the allow list of IP addresses is minimized by ensuring that the additional IP address included is for the same organization already allowed to access the machine.

The methods and systems may combine multiple allowed IPs from the ACL allow rules to single or small number of IP prefixes. The methods and systems calculate a minimum of the bit changes in transforming the IP addresses from one to another. Using the information for the minimum bit changes in transforming the IP addresses from one to another, the methods and systems build a graph of IP addresses, where the vertices are the IP addresses, and the edges denote that the IP addresses may be transformed from one to another using the minimum number of bit changes. The methods and systems recursively merge the nodes to reduce the ACL rules, while keeping the security risks bounded.

The methods and systems also support deny rules. The methods and systems may ensure that the additional IP addresses provided access by combining the allowed IP addresses into a smaller number of prefixes are not included in the deny rules. As such, the methods and systems reduce the security risk of providing additional IP addresses access by ensuring the additional IP addresses are not blocked by the deny rules.

One technical advantage of the methods and systems of the present disclosure is reducing the speed of the ACL lookup. By reducing the ACLs, a reduction occurs in the ACL lookup time, which increases the number of packets processed. Moreover, as the number of ACL rules increase, the management of the ACL becomes difficult. By reducing the ACL rules, less errors occur in the management of the ACL rules.

As such, the methods and systems of the present disclosure merge the allow rules into a reduced subset of allow rules by determining an amount of compression to perform to reduce the ACLs. Reducing the allow rules may open slightly more IP addresses to have access to the applications, services, and/or the machines than originally designated in the allow rules. The methods and systems perform additional verifications, such as, ensuring the IP address is from a same organization that was originally allowed access and/or ensuring that the additional IP are not restricted, to minimize the risk of providing the additional IP addresses access.

Referring now to FIG. 1, illustrated is an example environment 100 for reducing ACL rules. The environment 100 includes an ACL compressor component 102 that receives ACL rules 10 as input and outputs a reduced set of ACL rules 42. The environment 100 may include a plurality of devices, where each device includes the ACL compressor component 102 and outputs the reduced set of ACL rules 42 for each device.

The ACL rules 10 provide rules that protect access to applications, services, and/or machines. The ACL rules 10 are used for providing access to applications, services, and/or machines provided by a service provider or preventing unauthorized access to applications, services, and/or machines provided by a service provider. In some implementations, the service provider is a cloud service provider. As such, the ACL rules protect the applications, services, and/or machines from unauthorized access or malicious actors. The ACL rules 10 may be consistent across different applications, services, and/or machines provided by a service provider. In addition, the ACL rules 10 may be different for different applications, services, and/or machines provided by a service provider.

The ACL rules 10 include one or more allow rules 12. The allow rules 12 specify the allowed IP addresses that have permission to access applications, services, and/or machines provided by a service provider. Each organization is assigned a range of IP addresses. The allow rules 12 may specify one or more IP addresses allowed access within one or more organizations. In some implementations, the allowed IP addresses are IP addresses without prefixes. In some implementations, the allowed IP addresses include prefixes (e.g., the IP address has a bit identified as don't care with an "X" and may be either a "1" or a "0"). In some implementations, the allowed IP address are direct IP address. The allowed IP addresses may be within the service provider's organization or outside of the service provider's organization. As such, the allowed IP addresses are provided access for communicating with applications, services, and/ or machines provided by a service provider.

The ACL rules 10 may also include one or more deny rules 14. The deny rules 14 may specify blocked IP addresses that are prevented from accessing the applications, services, and/or machines of a service provider. The deny rules 14 may block IP address within one or more organizations. In some implementations, the blocked IP addresses are arbitrary IP prefixes. The blocked IP addresses may be within the service provider's organization or outside of the service provider's organization. As such, the blocked IP are prevented from communicating with applications, services, and/or machines provided by a service provider. Moreover, by default, the remaining traffic of the unspecified IP addresses (e.g., any IP addresses not included in the allow rules 12 or the deny rules 14) is blocked and prevented from accessing the applications, services, and/or machines provided by the service provider.

The ACL compressor component 102 determines a minimum number of bit changes 16 to transform one IP address to another IP address included in the allow rules 12. The ACL compressor component 102 compares each pair of IP addresses included in the allow rules 12 (e.g., the allowed IP addresses) to determine the minimum number of bit changes 16 to transform each pair of IP addresses. In some implementations, the ACL compressor component 102 uses an exclusive or (XOR) operation to calculate the minimum number of bit changes 16 between the different pairs of IP addresses.

The ACL compressor component 102 builds an ACL rule graph 18 using the minimum number of bit changes 16. The nodes 20 of the ACL rule graph 18 are the allowed IP addresses from the allow rules 12. The edges 22 denotes that the allowed IP addresses may be transformed with the minimum number of bit changes 16. In some implementations, the nodes 20 in the ACL rule graph 18 may not have a corresponding edge 22. For example, if an allowed IP address is unable to transform to another allowed IP address within the minimum number of bit changes 16, the allowed IP address may be included in the ACL rule graph 18 as a node 20 without any edges 22.

The ACL compressor component 102 may reduce the ACL rules 10 by merging the nodes 20 in the ACL rule graph 18. In some implementations, the ACL compressor component 102 identifies one or more candidate nodes 24 with a least number of edges in the ACL rule graph 18. If more than one candidate node 24 is identified in the ACL rule graph 18, the ACL compressor component 102 may select one of the candidate nodes 24 at random. The ACL compressor component 102 identifies among the neighbors of the candidate node 24 (e.g., the nodes 20 in the ACL rule graph 18 connected to the candidate node 24 by edges 22), a victim node 26 with a least number of edges 22.

The ACL compressor component 102 merges the candidate node 24 and the victim node 26 into a new node, a product node 28. As the candidate node 24 and the victim node 26 are merged into the product node 28, a merged IP address for the product node 28 is created based on combing the IP address of the candidate node 24 and the IP address of the victim node 26 into a single IP address. The merged IP address for the product node 28 is determined by identifying the bits in the IP address of the candidate node 24 that are different from the bits in the IP address of the victim node 26. The different bits in the merged IP address are marked with an "X" indicating that the value of that bit can be either "1" or "0."

One example use case includes a candidate node 24 with an IP address "0000" and a victim node 26 with an IP address "0001." The IP address for the product node 28 is "000X," since the last bit of the IP address of the candidate node 24 and the victim node 26 is different. Another example use case includes a candidate node 24 with an IP address "000X" and a victim node 26 with an IP address "001X." The IP address for the product node 28 is "00XX,"

since the third bit of the IP address of the candidate node 24 and the victim node 26 is different.

In some implementations, the IP address may include prefixes with different mask lengths. The ACL compressor component 102 may maintain any "X" in the input IP address (e.g., IP address of the candidate node 24 or the IP address of the victim node 26) in the merged IP address in the product node 28. One example use case includes the candidate node 24 with an IP address of "101X" and the victim node 26 with an IP address "00XX." The ACL compressor component 102 may merge the IP addresses of "101X" and "00XX" into the merged IP address "XOXX" in the product node 28. As such, the ACL compressor component 102 maintained any "X" from the input IP addresses while identifying the different bits (e.g., the first bit) with an "X."

In some implementations, the ACL compressor component 102 evaluates the IP address for each product node 28 to determine a number of false allows 34 generated by merging the IP address of the candidate node 24 with the IP address of the victim node 26 into the merged IP address for the product node 28. The false allows 34 are any additional IP addresses included in the merged IP address not identified in the explicit allow rules 12. One example use case includes an explicit allow rule 12 of "allow 0000" and a product node 28 with a merged IP address of "000X." As such, the product node 28 allows IP addresses with "0000" and "0001." The false allow in this example is the IP address "0001," the additional IP address allowed by the product node 28 not identified in the explicit allow rule 12 (e.g., "allow 0000"). As such, access to the applications, services, and/or machines of the service provider is now provided to the additional IP addresses included in the false allows 34. The ACL compressor component 102 may verify that the additional IP addresses included in the false allows 34 are assigned to a range for the same organization included in the allow rules 12 to ensure the security risk is minimized by allowing access to the additional IP addresses. If the additional IP addresses are assigned to the same organization assigned to the IP addressed in the allow rules 12, the ACL compressor component 102 may add the product node 28 to the ACL rule graph 18 in the place of the candidate node 24 and the victim node 26. If the additional IP addresses are assigned to a different organization than the organization assigned the allowed IP addresses in the allow rules 12, the ACL compressor component 102 may prevent the product node 28 from being added to the ACL rule graph 18.

In addition, the ACL compressor component 102 may compare the number of additional IP addresses included in the false allows 34 to a threshold 36 to determine whether to allow the merging of the candidate node 24 and the victim node 26. The threshold 36 may identify a percentage of additional IP addresses to allow (e.g., 25% of total allow rules or 25% of total nodes in the network). The threshold 36 may be a predetermined value or set by users (e.g., the service provider) to limit the security risk of allowing additional IP address not explicitly mentioned in the allow rules. The threshold 36 value may be different for different organizations. In addition, the threshold 36 value may be different for different applications, services, and/or machines provided by the service provider.

If the number of additional IP addresses included in the false allows 34 is below or equal to the threshold 36, the ACL compressor component 102 may merge the candidate node 24 and the victim node 26 to generate a product node 28 with the merged IP address. The product node 28 replaces the candidate node 24 and the victim node 26 in the ACL rule graph 18. In addition, the edge 22 between the candidate node 24 and the victim node 26 is removed from the ACL rule graph 18.

The ACL compressor component 102 may continue to identify additional candidate nodes 24 and additional victim nodes 26 in the ACL rule graph 18 to merge until the number of additional IP addresses included in the false allows 34 of the merged IP addresses of the new product nodes 28 exceed the threshold 36. If the number of additional IP addresses included in the false allows 34 is above the threshold 36, the ACL compressor component 102 may prevent the merging of the candidate node 24 and the victim node 26.

In some implementations, the ACL rules 10 include deny rules 14 with the blocked IP address from accessing the applications, services, and/or machines provided by the service provider. The ACL compressor component 102 may add one or more deny nodes 30 and/or one or more deny edges 32 to the ACL rule graph 18. The deny nodes 30 represent the block IP addresses included in the deny rules 14. The deny nodes 30 may be visually distinct from the nodes 20.

A deny edge 32 is added between the nodes 20 and the deny nodes 30 in response to determining that the allowed IP address in the allow rules 12 (e.g., the IP address of the node 20) may be transformed to the blocked IP address in the deny node 30 by the minimum number of bit changes 16. The deny edges 32 may be visually distinct from the edges 22.

The ACL compressor component 102 may compare the merged IP addresses of the product node 28 to any neighbor deny edges 32. If the merged IP addresses of the product node 28 is a subset of the blocked IP addresses of the neighbor deny edges 32 (e.g., one or more of the IP address of the product node is included in the deny IP addresses), the ACL compressor component 102 may discard the product node and prevent the candidate node 24 and the victim node 26 from merging, and thus, maintaining any deny rules 14. In addition, the ACL compressor component 102 may prevent the merging of nodes if the node (e.g., the node 20, the product node 28, or the victim node 26) has only a deny edge 32 connecting the node to a deny node 30.

The ACL compressor component 102 may generate a compressed ACL rule graph 38 with merged nodes 40 (e.g., one or more of the produce nodes 28), any remaining nodes 20 and edges 22 from the ACL rule graph 18 that were not merged, and any deny nodes 30 or any deny edges 32. As such, the ACL compressor component 102 may merge one or more nodes 20 and/or one or more edges 22 in the ACL rule graph 18 to generate a compressed ACL rule graph 38 while maintaining any deny rules 14.

The ACL compressor component 102 may use the compressed ACL rule graph 38 to generate a reduced set of ACL rules 42. The reduced set of ACL rules 42 include allow rules 44 and deny rules 14. The allow rules 44 may be generated using the merged nodes 40 and the nodes 20 from the compressed ACL rule graph 38. The deny rules 14 are the same deny rules received in the ACL rules 10 and may also be generated using the deny nodes 30 and the deny edges 32. The reduced set of ACL rules 42 is a succinct set of ACL rules consisting of allow rules 44 and the deny rules 14. As such, the number or rules included in the allow rules 44 are less than the original allow rules 12 received by the ACL compressor component 102.

In some implementations, the ACL rules 10 may change. For example, new rules may be added (e.g., adding new allow rules or adding new deny rules), or rules are removed (e.g., removing deny rules or removing allow rules). Another example includes changing rules (e.g., changing the allow rules to deny rules or changing the deny rules to allow rules). As such, the ACL rules 10 may not remain the same. The ACL compressor component 102 may update the ACL rule graph 18 and/or the compressed ACL rule graph 38 based on the changes in the ACL rules 10.

In some implementations, in response to receiving a new allow rule 12, the ACL compressor component 102 may recalculate the minimum number of bit changes 16 based on the new allow rule 12. The ACL compressor component 102 compares the new value determined for the minimum number of bit changes 16 to the previously calculated value for the minimum number of bit changes 16. In response to determining that the new value for the minimum number of bit changes 16 is the same as the previously calculated value for the minimum number of bit changes 16, the ACL compressor component 102 adds the IP address associated with the new allow rule 12 to the compressed ACL rule graph 38 as a new node 20 and merge the new node 20, if required.

In response to determining that the new value for the minimum number of bit changes 16 is different from the previously calculated value for the minimum number of bit changes 16, the ACL compressor component 102 generates a new ACL rule graph 18 based on the new value for the minimum number of bit changes 16. The ACL compressor component 102 merges the nodes to identify a new compressed ACL rule graph 38. The ACL compressor component 102 uses the new compressed ACL rule graph 38 to determine the reduced set of ACL rules 42.

In some implementations, in response to receiving a new deny rule 14, the ACL compressor component 102 adds the new deny rule 14 to the compressed ACL rule graph 38 as a new deny node 30. The ACL compressor component 102 also identifies any IP addresses in the nodes (e.g., the nodes 20, the merged nodes 40, or the deny nodes 30) in the compressed ACL rule graph 38 with an "X" in the IP address and compare the IP addresses with an "X" to the blocked IP address of the new deny rule 14. In response to determining that the IP address of a node matches the blocked IP address in the new deny rule 14, the ACL compressor component 102 splits the node into allow rules 12 and the deny rule 14, and thus, ensuring that the new deny rule 14 is maintained in the compressed ACL rule graph 38.

The reduced set of ACL rules 42 may be provided to a filtering component 104 to filter the network traffic received for the applications, services, and/or machines of the service provider (e.g., providing access to the allowed IP addresses from the allow rules 44 and preventing access to the blocked IP address included in the deny rules 14). In some implementations, the filtering component 104 is implemented in a virtual filtering platform. In some implementations, the filtering component 104 is implemented in the central processing unit (CPU) or a field-programmable gate array (FPGA) of a device.

In some implementations, one or more computing devices (e.g., servers and/or devices) are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the ACL compressor component 102 and the filtering component 104 are implemented wholly on the same computing device. Another example includes one or more subcomponents of the ACL compressor component 102 and the filtering component 104 are implemented across multiple computing devices. Moreover, in some implementations, one or more subcomponent of the ACL compressor component 102 and the filtering component 104 may be implemented are processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

One example use case includes the environment 100 includes 50 devices where each device of the 50 devices has the ACL compressor component 102 running on the device receiving the input of the ACL rules 10, performing the processing discussed above, and providing an output of the reduced set of ACL rules 42 for use on the device.

The environment 100 uses the ACL rules 10 to provide security to the applications, services, and/or the machines provided by the service provider. The environment 100 reduces the number of ACL rules 10 received to a reduced set of ACL rules 42, while reducing the security risk. By reducing the ACL rules 10 to the reduced set of ACL rules 42, a reduction occurs in the ACL lookup time and the number of packets processed may increase.

Figure 2:
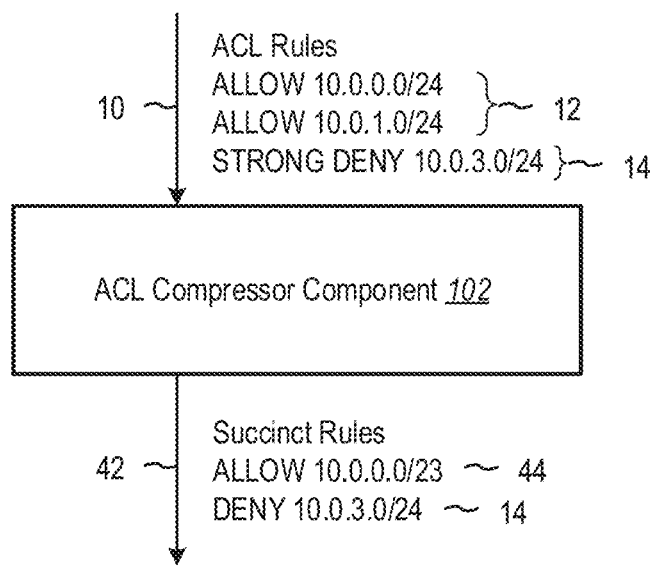
FIG. 2 illustrates example input ACL rules and an output with a reduced set of ACL rules in accordance with implementations of the present disclosure.

Referring now to FIG. 2, illustrated is an example of input ACL rules 10 to the ACL compressor component 102 and an output with a reduced set of ACL rules 42. The ACL compressor component 102 receives two allow rules 12 Rule 1 "allow 10.0.0.0/24" and Rule 2 "allow 10.0.1.0/24" and one deny rule 14 "strong deny 10.0.3.0/24." As such, the IP addresses from the two allow rules 12 are allowed to communicate with the applications, services, and/or machines provided by the service provider. However, the IP addresses from the deny rule 14 are blocked from communicating with the applications, services, and/or machines provided by the service provider. The ACL compressor component 102 preforms the processing discussed in FIG. 1 and reduces the allow rules 12 into a single allow rule.

The ACL compressor component 102 outputs a reduced set of ACL rules 42 with one allow rule 44 "allow 10.0.0.0/23" and one deny rule 14 "deny 10.0.3.0/24." By combining the allow rules 12 in a single allow rule, additional IP addresses previously uncategorized are allowed to access the applications, services, and/or machines provided by the service provider.

Figure 3A:
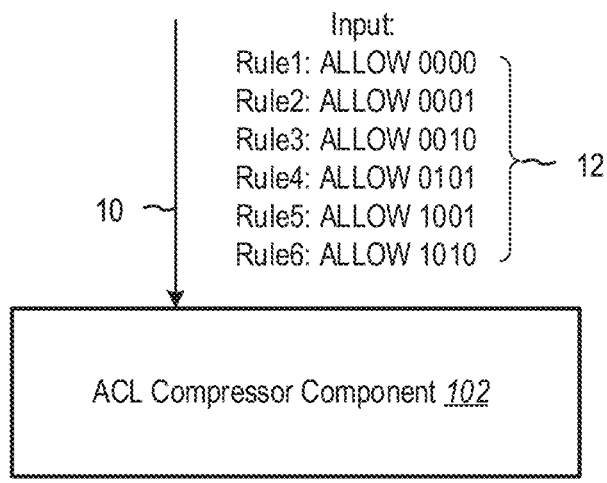
FIG. 3A illustrates example input ACL rules in accordance with implementations of the present disclosure.

Referring now to FIG. 3A, illustrated are example input ACL rules 10 for IP addresses without prefixes. The ACL rules 10 include six allow rules 12, Rule 1 "allow 0000," Rule 2 "allow 0001," Rule 3 "allow 0010," Rule 4 "allow 0101," Rule 5 "allow 1001," and Rule 6 "allow 1010." The ACL compressor component 102 may consider the IP addresses as 4 bits (instead of 32 bits IP addresses) without a loss of generality.

The ACL compressor component 102 calculates a minimum number of bit changes 16 to transform one IP address to another IP address in the allow rules 12. The ACL compressor component 102 compares each pair of IP addresses included in the six allow rules 12 to determine the minimum number of bit changes 16 to transform each pair of IP addresses. In some implementations, the ACL compressor component 102 uses an exclusive or (XOR) operation to calculate the minimum number of bit changes 16 between the different pairs of IP addresses.

The minimum number of bit changes 16 between the different pairs of IP addresses in this example is 1 bit. For example, the IP address from rule 1 "0000" may be transformed to the IP address from rule 2 "0001" by transforming the last bit from "0" to "1." Another example includes the IP address from rule 1 "0000" may be transformed to the IP address from rule 3 "0010" by transforming the third bit from "0" to "1." Another example includes the IP address from rule 2 "0001" may be transformed to the IP address from rule 5 "1001" by transforming the first bit from "0" to "1". Another example includes the IP address from rule 2 "0001" may be transformed to the IP address from rule 4 "0101" by transforming the second bit from "0" to "1." Another example includes the IP address from rule 3 "0010" may be transformed to the IP address from rule 6 "1010" by transforming the first bit from "0" to "1."

Figure 3B:
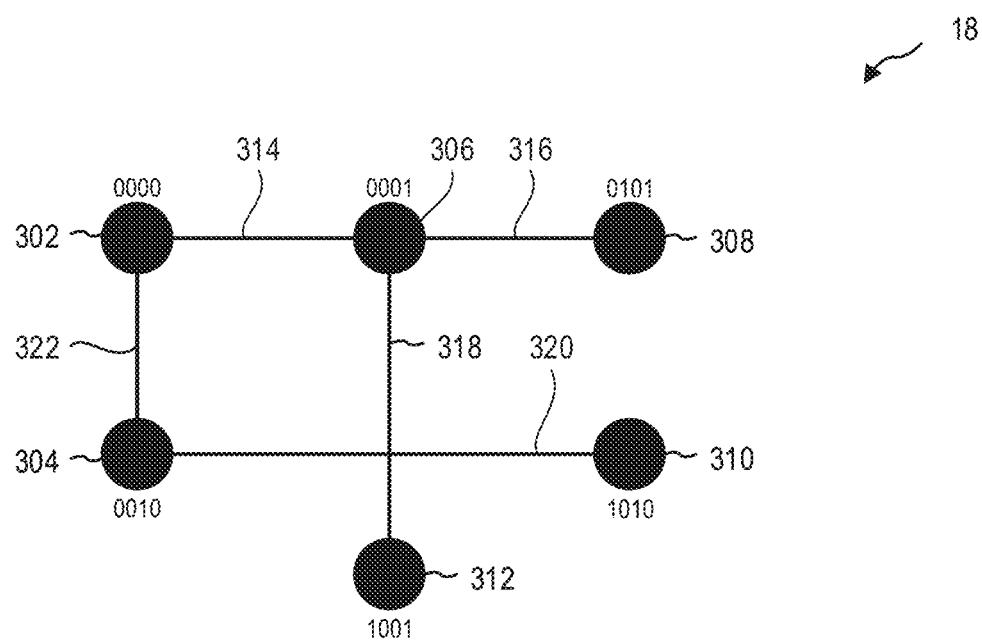
FIG. 3B illustrates an example ACL rule graph generated for the input ACL rules in accordance with implementations of the present disclosure.

Referring now to FIG. 3B, illustrated is an ACL rule graph 18 generated for the allow rules 12 of FIG. 3A based on the minimum number of bit changes 16 (e.g., 1 bit) determined to transform one IP address to another IP address. The ACL rule graph 18 includes a plurality of nodes 20 (e.g., node 302, node 304, node 306, node 308, node 310, node 312) that represent the IP addresses from the allow rules 12 of FIG. 3A.

The node 302 includes the IP address "0000" from rule 1. The node 304 includes the IP address "0010" from rule 3. The node 306 includes the IP address "0001" from rule 2. The node 308 includes the IP address "0101" from rule 4. The node 310 includes the IP address "1010" from rule 6. The node 312 includes the IP address "1001" from rule 5.

The ACL rule graph 18 also includes a plurality of edges 22 (e.g., edge 314, edge 316, edge 318, edge 320, and edge 322) that represent the number of bit changes 16 for transforming the IP addresses (e.g., 1 bit change). The edge 314 illustrates that the IP address from the node 302 may be transformed to the IP address from the node 306 by changing one bit (e.g., changing the last bit of the IP address in the node 302 from "0" to "1"). The edge 322 also shows that the IP address from the node 302 can be transformed to the IP address of the node 304 by changing one bit (e.g., changing the third bit of the IP address from the node 302 from "0" to "1").

The edge 316 illustrates that the IP address from the node 306 may be transformed to the IP address from the node 308 by changing one bit (e.g., changing the second bit of the IP address from the node 306 from "0" to "1"). The edge 318 also shows that IP address from the node 306 may be transformed to the IP address from the node 312 by changing one bit (e.g., changing the first bit IP address of the node 306 from "0" to "1"). The edge 320 shows that the IP address from the node 310 may be transformed to the IP address from the node 304 by changing one bit (e.g., changing the first bit of the IP address from the node 310 from "1" to "0").

The ACL rule graph 18 also illustrates which IP addresses included in the allow rules 12 are unable to transform to another IP address using the minimum number of bits. For example, the IP address of the node 302 is unable to transform to the IP address of the node 312 by changing one bit. Instead, two bits would need to be changed, and thus, an edge is not present between the node 302 and the node 312 in the ACL rule graph 18.

Figure 4:
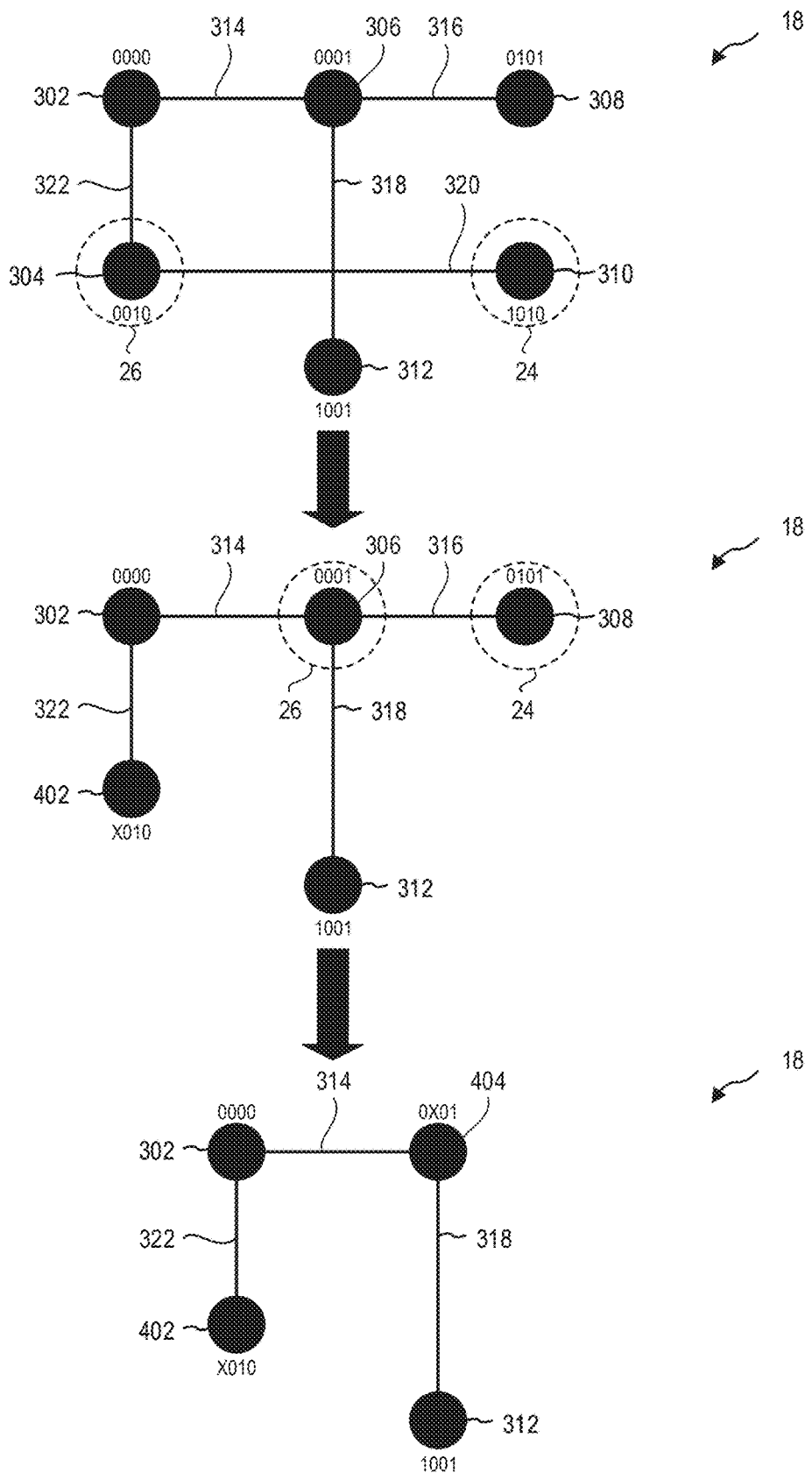
FIG. 4 illustrates an example of merging nodes in an ACL rule graph in accordance with implementations of the present disclosure.

Referring now to FIG. 4, illustrated is an example of merging nodes 20 in an ACL rule graph 18. For the illustrated example, the ACL rule graph 18 is the same ACL rule graph 18 in FIG. 3 with the nodes 302, 304, 306, 308, 310, 312 and the edges 314, 316, 318, 320, 322. The ACL compressor component 102 identifies the node 310 as a candidate node 24 (e.g., a node with a least number of edges) and identifies the node 304 as the victim node 26 (e.g., a neighbor node to the node 310 with a least number of edges).

The ACL compressor component 102 also identifies the bits that are different (e.g., the first bit) between the IP address "1010" of the node 310 (e.g., the candidate node 24) and the IP address "0010" of the node 304 (e.g., the victim node 26). The ACL compressor component 102 merges the node 310 and the node 304 into a new product node 402. The ACL compressor component 102 creates a merged IP address for the new product node 402 based on combining the IP address of the candidate node 24 and the victim node 26 together. The bit identified as different between the IP address of the node 310 and the IP address of the node 304 (e.g., the first bit) is marked with an "X" in the merged IP address. As such, the product node 402 includes the merged IP address of "X010."

The ACL compressor component 102 removes the node 304, the node 310, and the edge 320 from the ACL rule graph 18 based on the merging of the node 310 with the node 304 and replaces the node 304 with the new product node 402 and the merged IP address.

The ACL rule graph 18 is reduced from six nodes (e.g., six allow rules) to five nodes (e.g., five allow rules). The ACL compressor component 102 may determine the compression is complete and may use the ACL rule graph 18 with four nodes as the compressed ACL rule graph 38 (FIG. 1).

In addition, the ACL compressor component 102 may continue to compress the nodes further in the ACL rule graph 18. The ACL compressor component 102 may identify the node 308 as a next candidate node 24 in the ACL rule graph 18 (e.g., a node with a least number of edges) and may identify the node 306 as a next victim node 26 (e.g., a neighbor node to the node 308 with a least number of edges). The ACL compressor component 102 identifies the bits that are different (e.g., the second bit) between the IP address "0101" of the node 308 and the IP address "0001" of the node 306. The ACL compressor component 102 merges the node 308 and the node 306 into a new product node 404.

The ACL compressor component 102 creates a merged IP address for the new product node 404 based on combining the IP address of the node 308 (e.g., the candidate node 24) and the node 306 (e.g., the victim node 26) together. The bit identified as different between the IP address of the node 310 and the IP address of the node 304 (e.g., the second bit) is marked with an "X" in the merged IP address. As such, the product node 404 includes the merged IP address of "0X01."

The ACL compressor component 102 removes the node 308, the node 306, and the edge 316 from the ACL rule graph 18 based on the merging of the node 308 with the node 306 and replaces the node 306 with the new product node 404 and the merged IP address. As such, the ACL rule graph 18 is reduced from six nodes (e.g., six allow rules) to four nodes (e.g., four allow rules). The ACL compressor component 102 may determine the compression is complete and may use the ACL rule graph 18 with four nodes as the compressed ACL rule graph 38 (FIG. 1). The ACL compressor component 102 may continue to compress the nodes further in the ACL rule graph 18, as illustrated in FIG. 5.

Figure 5:
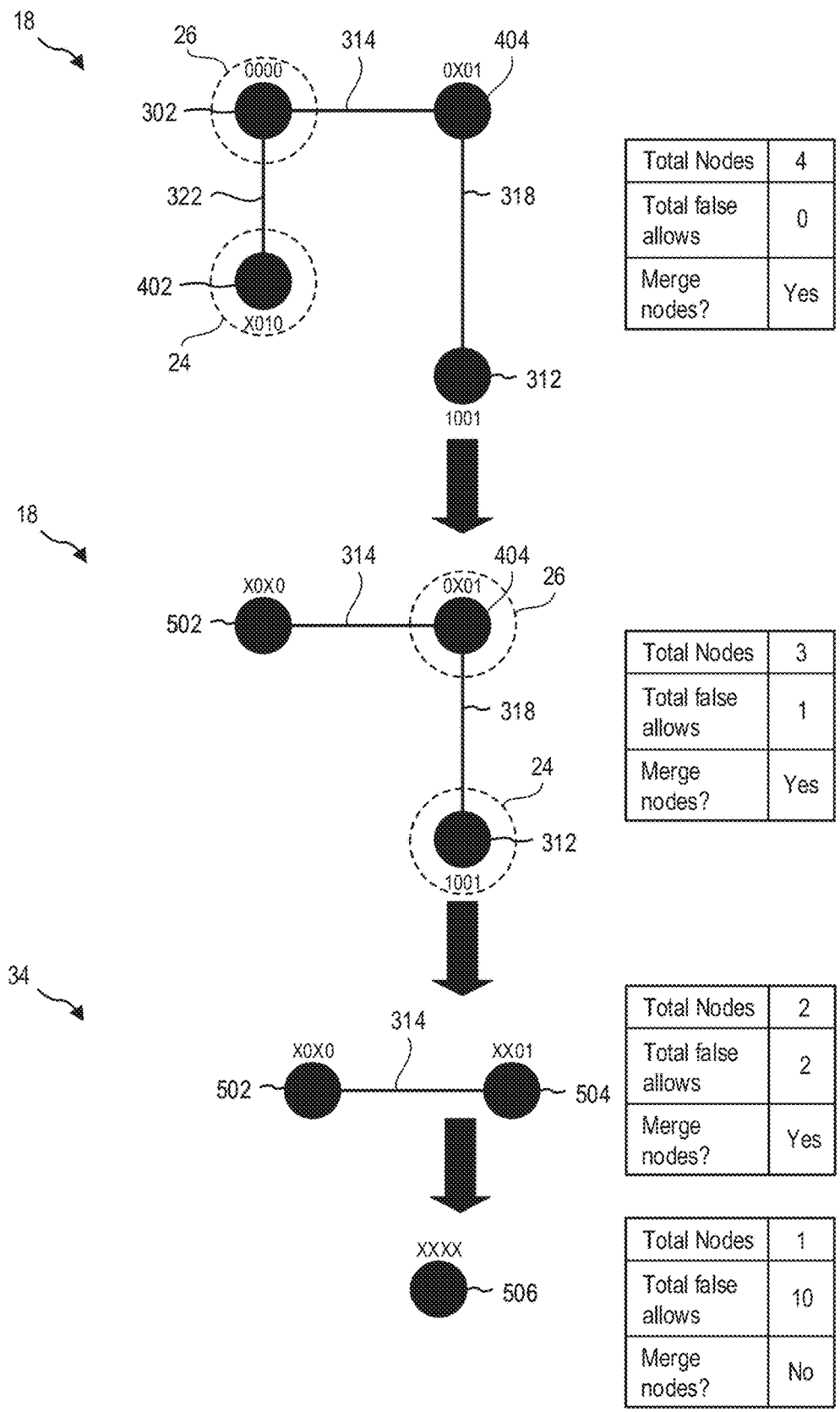
FIG. 5 illustrates an example compressed ACL rule graph in accordance with implementations of the present disclosure.

Referring now to FIG. 5, illustrated is an example of a compressed ACL rule graph 38 generated by merging the nodes in the ACL rule graph 18 discussed in FIG. 4 and comparing the false allows 34 (FIG. 1) for the IP addresses generated by merging the candidate nodes 24 and the victim nodes 26 together to a threshold 36. For this example, the threshold 36 is set to 35% of a fraction of total allowed IPs (e.g., 35% of total allow rules) or a fraction of total IPs (e.g., 35% of total IPs).

The ACL compressor component 102 may determine that the total nodes of the ACL rule graph 18 is four (corresponding to four allow rules) and that the total false allows are zero (e.g., all the IP addresses in the nodes are currently included in the allowed IP address of the allow rules 12). As such, the ACL compressor component 102 may determine that the nodes may remain merged since the number of false allows 34 (e.g., zero IP addresses) is less than the threshold 36 value of 35%.

The ACL compressor component 102 may identify the product node 402 with the IP address "X010" as a next candidate node 24 (e.g., the node with a node with a least number of edges) and may identify the node 302 with the IP address "0000" as a next victim node 26 (e.g., a neighbor node to the product node 402 with a least number of edges). The ACL compressor component 102 identifies the bits that are different (e.g., the third bit) between the IP address "X010" of the product node 402 and the IP address "0000" of the node 302.

The ACL compressor component 102 merges the product node 402 and the node 302 into a new product node 502 in response to determining that the total number of false allows 34 (e.g., the 1 additional IP address) is less than the threshold 36 value (e.g., 25%). The ACL compressor component 102 creates a merged IP address for the new product node 502 based on combining the IP address of the product node 402 (e.g., the candidate node 24) and the node 302 (e.g., the victim node 26) together. The bit identified as different between the IP address of the product node 402 and the IP address of the node 302 (e.g., the third bit) is marked with an "X" in the merged IP address. As such, the product node 502 includes a merged IP address of "X0X0."

The ACL compressor component 102 removes the product node 402, the node 302, and the edge 322 from the ACL rule graph 18 based on the merging of the product node 402 with the node 302 and replaces the node 302 with the new product node 502 and the merged IP address. As such, the ACL rule graph 18 is reduced from four nodes (e.g., four allow rules) to three nodes (e.g., three allow rules). The ACL compressor component 102 may determine that the total false allows are one (e.g., one additional IP addresses "1000" not included in the original allow rules 12 (FIG. 3A) is now allowed to access the applications, services, and/or machines of the service provider). The ACL compressor component 102 may determine that the nodes may remain merged since the number of false allows 34 (e.g., 1 IP addresses) is less than the threshold 36 value of 35%.

The ACL compressor component 102 may identify the node 312 with the IP address "1001" as a next candidate node 24 (e.g., the node with a node with a least number of edges) and may identify the product node 404 with the IP address "0X01" as a next victim node 26 (e.g., a neighbor node to the node 312 with a least number of edges). The ACL compressor component 102 identifies the bits that are different (e.g., the first bit) between the IP address "1001" of the node 312 and the IP address "0X01" of the product node 404.

The ACL compressor component 102 merges the node 312 and the product node 404 into a new product node 504. The ACL compressor component 102 generates a merged IP address for the new product node 504 based on combining the IP address of the node 312 (e.g., the candidate node 24) and the product node 404 (e.g., the victim node 26) together. The bit identified as different between the IP address of the node 312 and the IP address of the product node 404 (e.g., the first bit) is marked with an "X" in the updated IP address. The ACL compressor component 102 may maintain any "X" in the input IP address in the output IP address. As such, the product node 504 includes a merged IP address of "XX01" (the "X" indicating the difference between the first bit and the "X" from the IP address of the product node 404).

The ACL compressor component 102 removes the node 312, the product node 404, and the edge 318 from the ACL rule graph 18 based on the merging of the node 312 with the product node 404 and replaces the product node 404 with the new product node 504 and the merged IP address. As such, the ACL rule graph 18 is reduced from three nodes (e.g., three allow rules) to two nodes (e.g., two allow rules). The ACL compressor component 102 may determine that the total false allows are two (e.g., two additional IP addresses "1000" and "1101" not included in the original allow rules 12 (FIG. 3A) are now allowed to access the applications, services, and/or machines of the service provider). The ACL compressor component 102 may determine that the nodes may remain merged since the number of false allows 34 (e.g., 2 IP addresses) is less than the threshold 36 value of 35%.

The ACL compressor component 102 may merge the remaining two nodes, the product node 502 with an IP address "X0X0" and the product node 504 with an IP address "XX01" into a new product node 506 node with a merged IP address "XXXX." The ACL compressor component 102 may determine that the merged IP address "XXXX" allows 10 additional IP addresses in the false allows 34, which is greater than the threshold 36 value of 35%. As such, the ACL compressor component 102 may not allow the product node 502 and the product node 504 to merge.

The ACL compressor component 102 may identify the ACL rule graph 18 with two merged nodes (e.g., the product node 502 and the product node 504) and the edge 314 as the compressed ACL rule graph 38. The compressed ACL rule graph 38 may be used to identify the reduced set of ACL rules 42 with the allow rules (e.g., the product node 502 and the product node 504).

Figure 6:
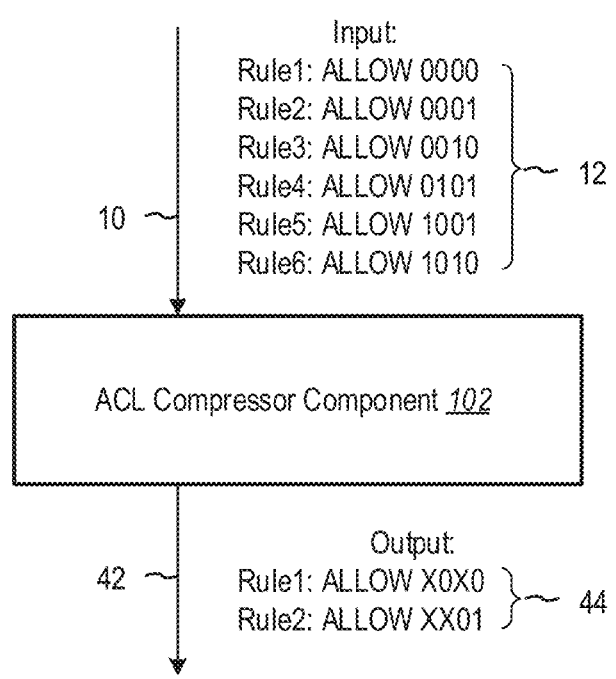
FIG. 6 illustrates example input ACL rules and an output with a reduced set of ACL rules in accordance with implementations of the present disclosure.

Referring now to FIG. 6, illustrated is an example of input ACL rules 10 for IP addresses without prefixes. The ACL rules 10 include six allow rules 12, Rule 1 "allow 0000," Rule 2 "allow 0001," Rule 3 "allow 0010," Rule 4 "allow 0101," Rule 5 "allow 1001," and Rule 6 "allow 1010." The ACL compressor component 102 may consider the IP addresses as 4 bits (instead of 32 bits IP addresses) without a loss of generality and may perform the processing discussed in FIGS. 3B, 4, and 5 to generate the output a reduced set of ACL rules 42 with two allow rules 44, Rule 1 "allow X0X0" and Rule 2 "allow XX01." The reduced set of ACL rules 42 are determined using the nodes (e.g., the product node 502 and the product node 504) of the compressed ACL rule graph 38 (FIG. 5). The six allow rules 12 are reduced to two allow rules 44, resulting in a reduction in the ACL rules (e.g., a 67% reduction).

Figure 7:
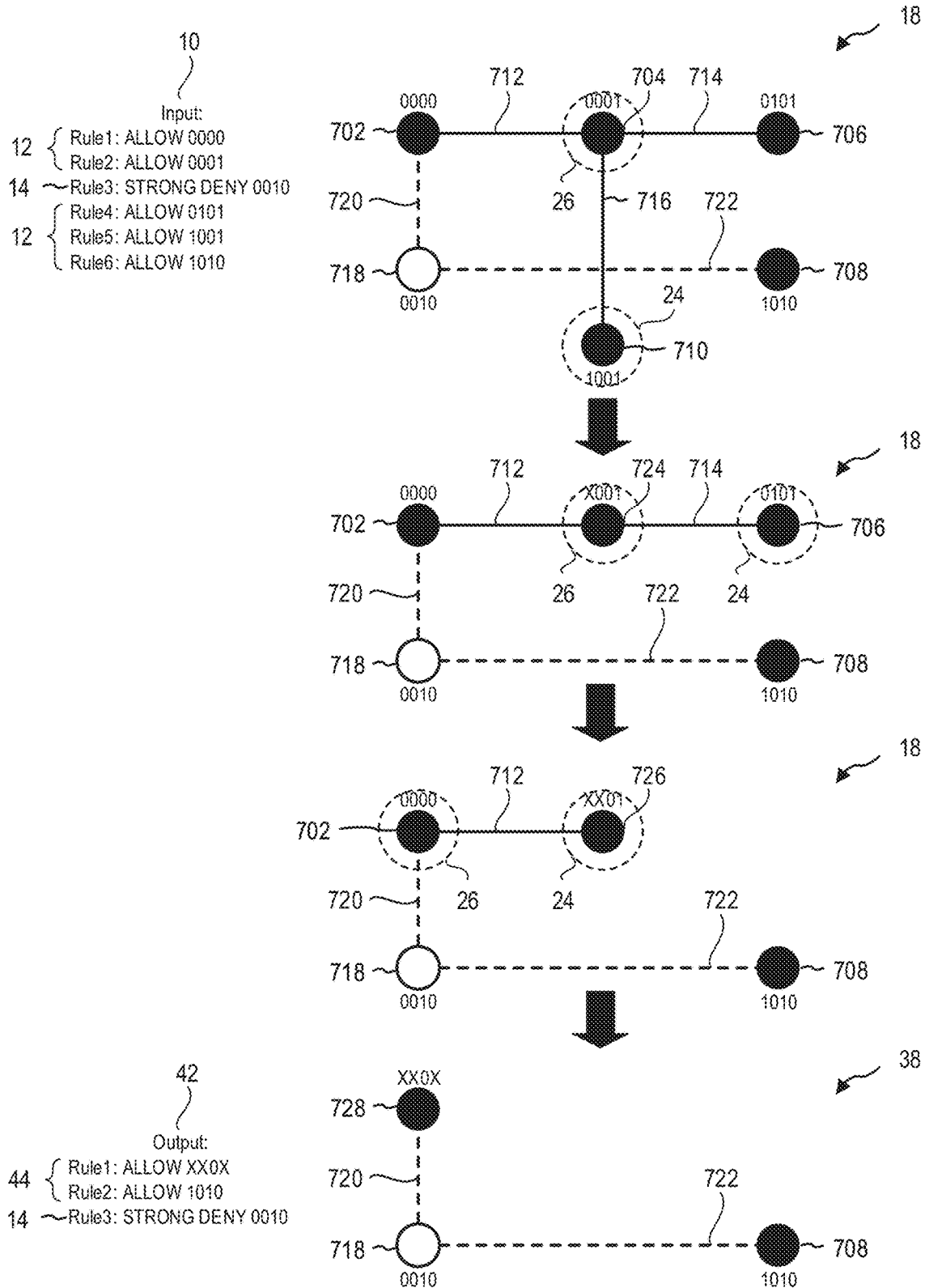
FIG. 7 illustrates an example compressed ACL rule graph with allow rules and deny rules in accordance with implementations of the present disclosure.

Referring now to FIG. 7, illustrated is an example compressed ACL rule graph with allow rules and deny rules. The input (e.g., the ACL rules 10) include five allow rules 12, Rule 1 "allow 0000," Rule 2 "allow 0001," Rule 4 "allow 0101," Rule 5 "allow 1001," and Rule 6 "allow 1010." The ACL rules 10 also include one deny rule 14, Rule 3 "Strong Deny 0010."

The ACL rule graph 18 includes two different types of nodes and two different types of edges. The ACL rule graph 18 includes one set of nodes 20 (FIG. 1) for the allow rules (e.g., nodes 702, 704, 706, 708, 710) and one set of edges 22 (FIG. 1) for the allow rules nodes 20 (e.g., edges 712, 714, 716). The ACL rule graph 18 includes deny nodes 30 (FIG. 1) for the deny rules (e.g., node 718) and deny edges 32 (FIG. 1) for the deny nodes 30 (e.g., edges 720, 722). The edge 720 indicates that the IP address "0000" of the node 702 may be transformed to the IP address "0010" of the deny node 718 using the minimum number of bit changes 16 (FIG. 1) (e.g., 1 bit in this example). In addition, the edge 722 indicates that the IP address "1010" of the node 708 may be transformed to the IP address "0010" of the deny node 718 using the minimum number of bit changes 16 (FIG. 1) (e.g., 1 bit). The node 718 may be visually distinct from the nodes 702, 704, 706, 708, 710. For example, the node 718 may be a different color or a different pattern from the nodes 702, 704, 706, 708, 710. In addition, the edges 720, 722 may be visually distinct from the edges 712, 714, 716. For example, the edges 720, 722 may be a different color, a different pattern, and/or a different line weight from the edges 712, 714, 716.

The ACL compressor component 102 may merge one or more nodes (e.g., 702, 704, 706, 708, 710) to reduce the allow rules. The ACL compressor component 102 may identify node 710 as a candidate node 24 (e.g., a node with a least number of edges) and may identify the node 704 as a victim node 26 (e.g., a neighbor node to the node 710). The ACL compressor component 102 identifies the bits that are different (e.g., the first bit) between the IP address "1001" of the node 710 and the IP address "0001" of the node 704. The ACL compressor component 102 merges the node 710 and the node 704 into a new product node 724.

The ACL compressor component 102 generates a merged IP address for the new product node 724 based on merging the IP address of the node 710 and the node 704 together. The bit identified as different between the IP address of the node 710 and the IP address of the node 704 (e.g., the first bit) is marked with an "X" in the merged IP address. As such, the product node 724 includes the merged IP address of "X001." The ACL compressor component 102 may verify that any false allows 30 generated from the merged IP address is less than the threshold 36 value. The ACL compressor component 102 removes the node 710, the node 704, and the edge 716 from the ACL rule graph 18 based on the merging of the node 710 with the node 704 and replaces the node 704 with the new product node 724 and the merged IP address.

The ACL compressor component 102 may identify the node 706 as a next candidate node 24 in the ACL rule graph 18 (e.g., a node with a least number of edges) and may identify the node 26 as a next victim node 26 (e.g., a neighbor node to the node 706 with a least number of edges). The ACL compressor component 102 identifies the bits that are different (e.g., the second bit) between the IP address "0101" of the node 706 and the IP address "X001" of the node 724. The ACL compressor component 102 merges the node 706 and the node 724 into a new product node 726.

The ACL compressor component 102 generates a merged IP address for the new product node 726 based on merging the IP address of the node 706 and the node 724. The bit identified as different between the IP address of the node 706 and the IP address of the node 724 (e.g., the second bit) is marked with an "X" in the merged IP address. The product node 726 includes the merged IP address of "XX01." The ACL compressor component 102 may maintain any "X" received in the input IP address in the merged IP addressed.

The ACL compressor component 102 may verify that any false allows 30 generated from the merged IP address is less than the threshold 36 value. The ACL compressor component 102 removes the node 706, the node 724, and the edge 714 from the ACL rule graph 18 based on the merging of the node 706 with the node 724 and replaces the node 724 with the new product node 726 and the merged IP address.

The ACL compressor component 102 may identify the product node 726 as a next candidate node 24 in the ACL rule graph 18 (e.g., a node with a least number of edges) and may identify the node 702 as a next victim node 26 (e.g., a neighbor node to the product node 726 with a least number of edges). The ACL compressor component 102 identifies the bits that are different (e.g., the last bit) between the IP address "XX01" of the product node 726 and the IP address "0000" of the node 702. The ACL compressor component 102 merges the product node 726 and the node 702 into a new product node 728.

The ACL compressor component 102 generates a merged IP address for the new product node 728 based on merging the IP address of the product node 726 and the node 702. The bit identified as different between the IP address of the product node 726 and the IP address of the node 702 (e.g., the last bit) is marked with an "X" in the merged IP address. The product node 728 includes the merged IP address of "XX0X." The ACL compressor component 102 may maintain any "X" received in the input IP address in the merged IP addressed.

The ACL compressor component 102 may verify that any false allows 30 generated from the merged IP address is less than the threshold 36 value. In addition, the ACL compressor component 102 may compare the merged IP address of the product node 728 against the neighbor deny node 718. If the merged IP address of the product node 728 is a subset of the IP address from the neighbor deny node 718, the ACL compressor component 102 discards the product node 728 and prevents the merge of the candidate node 24 and the victim node 26 from occurring. If the merged IP address of the product node 728 is not a subset of the IP address from the neighbor deny node 718, the ACL compressor component 102 adds the product node 728 to the ACL rule graph 18. In the illustrated example, the merged IP address "XX0X" of the product node 728 is not a subset of the IP address "0010" of the deny node 718. As such, the additional IP addresses that may be allowed based on the merging the IP addresses from the nodes 726 and 702 will not be "0010" (the blocked IP address), and thus, the security risk of allowing the additional IP addresses is reduced.

The ACL compressor component 102 removes the product node 726, the node 702, and the edge 712 from the ACL rule graph 18 based on the merging of the product node 726 with the node 702 and replaces the node 702 with the new product node 728 and the merged IP address.

The ACL compressor component 102 prevents the merging of the node 708 since the node 708 only has a deny edge 722 connecting the node 708 to the deny node 718. In addition, the ACL compressor component 102 prevents the merging of the product node 728 since the product node 728 only had a deny edge 720 connecting the product node 728 to the deny node 718.

As such, the compressed ACL rule graph 38 is generated by the ACL compressor component 102 with the product node 728, the node 708, the deny node 718, and the deny edges 720, 722. The ACL compressor component 102 may use the compressed ACL rule graph 38 to generate the reduced set of ACL rules 42 with two allow rules 44 (Rule 1 "allow XX0X" and Rule 2 "allow 1010") and one deny rule 14 ("Strong deny 0010").

Figure 8:
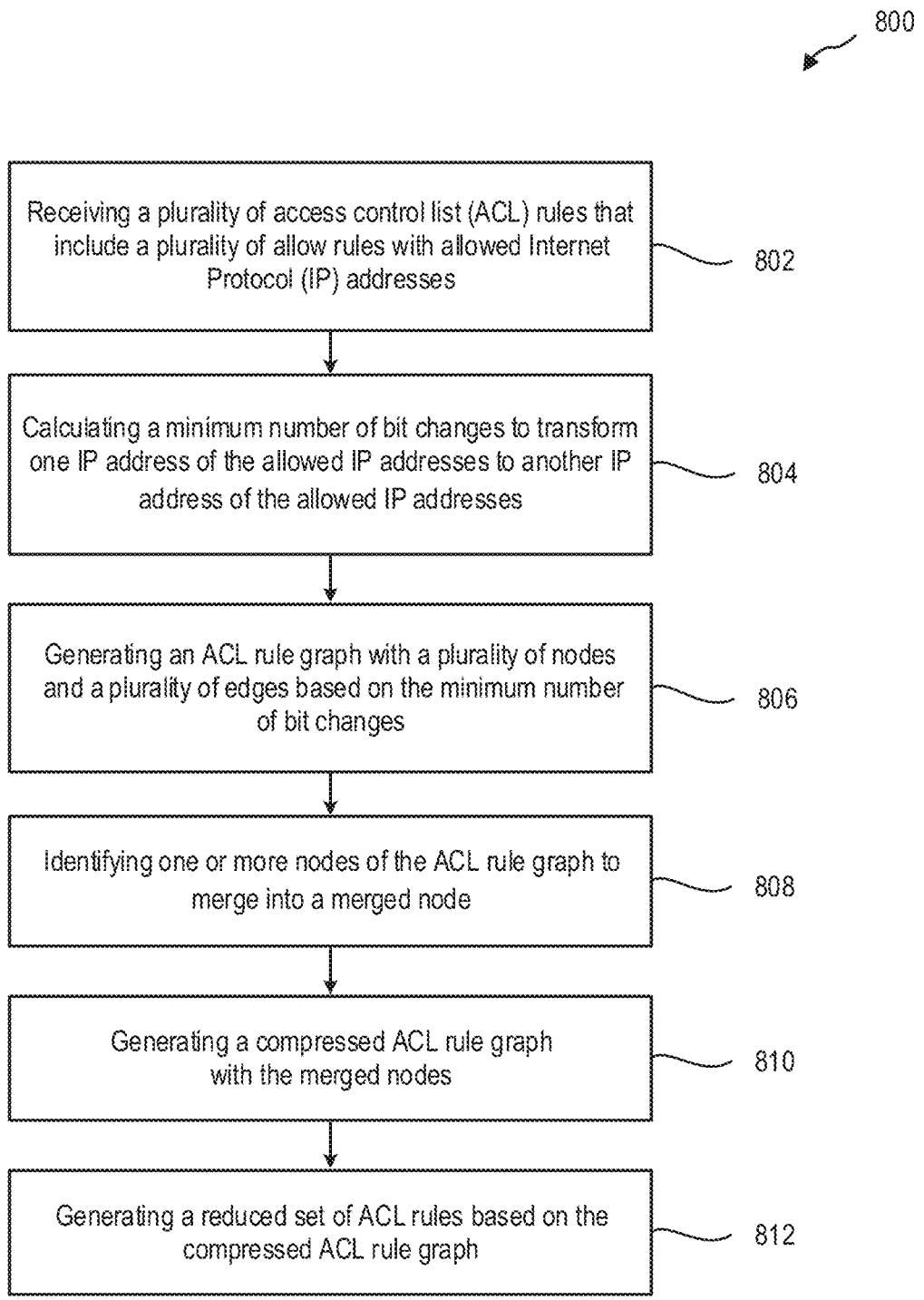
FIG. 8 illustrates an example method for reducing ACL rules in accordance with implementations of the present disclosure.

Referring now to FIG. 8, illustrated is an example method 800 for generating a reduced set of ACL rules. The actions of method 800 are discussed below with reference to the architecture of FIG. 1.

At 802, the method 800 includes receiving a plurality of ACL rules that include a plurality of allow rules with allowed IP addresses. The ACL compressor component 102 receives the ACL rules 10 with a plurality of allow rules 12. The allow rules 12 identify the allowed IP address that have access to one or more applications, services, and/or machines provided by a service provider.

At 804, the method 800 includes calculating a minimum number of bit changes to transform one IP address of the allowed IP addresses to another IP address of the allowed IP addresses. The ACL compressor component 102 calculates the minimum number of bit changes 16 to transform each pair of IP addresses included in the allowed IP addresses. In some implementations, the ACL compressor component 102 uses an exclusive or (XOR) operation to calculate the minimum number of bit changes 16 between the different pairs of IP addresses.

At 806, the method 800 includes generating an ACL rule graph with a plurality of nodes and a plurality of edges based on the minimum number of bit changes. The ACL compressor component 102 builds an ACL rule graph 18 using the minimum number of bit changes 16. Each node of the plurality of nodes 20 corresponds a different IP addresses of the allowed IP addresses and each edge 22 corresponds to the minimum number of bit changes 16 between each node of the ACL rule graph 18. The edges 22 denotes that the allowed IP addresses may be transformed with the minimum number of bit changes 16. In some implementations, the nodes 20 in the ACL rule graph 18 may not have a corresponding edge 22. For example, if an allowed IP address is unable to transform to another allowed IP address within the minimum number of bit changes 16, the allowed IP address may be included in the ACL rule graph 18 as a node 20 without any edges 22.

At 808, the method 800 includes identifying one or more nodes of the ACL rule graph to merge into a merged node. The ACL compressor component 102 may reduce the ACL rules 10 by merging the nodes 20 in the ACL rule graph 18. In some implementations, the ACL compressor component 102 identifies a candidate node 24 with a minimum number of edges and a victim node 26 that is connected to the candidate node 24 with an edge 22 to merge together. The ACL compressor component generates a product node 28 with a merged IP address that is a combination of an IP address of the candidate node 24 and the IP address of the victim node 26.

The ACL compressor component 102 may determining if any false allows occurred in the merged IP address of the product node 28. False allows may include providing access to additional IP addresses not included in the allowed IP addresses of the allow rules 12. The ACL compressor component 102 may determine if the false allows exceed a threshold 36 (e.g., if the number of additional IP addresses exceed the threshold 36). The ACL compressor component 102 may prevent the product node 28 with the merged IP address from being added to the ACL rule graph 18 in response to determining that the false allows exceed the threshold.

In addition, the ACL compressor component 102 may allow the product node 28 with the merged IP address to be added to the ACL rule graph 18 in response to determining that the false allows are below or equal to the threshold. The ACL compressor component 102 may continue to identify one or more nodes 20 and/or product nodes 28 of the ACL rule graph 18 to merge until the additional IP addresses included in the merged IP addresses of the product nodes 28 exceed the threshold 36.

In some implementations, the plurality of ACL rules 10 include one or more deny rules 14 identifying blocked IP addresses that are prevented from accessing one or more applications, services, and/or machines provided by a service provider. The ACL compressor component 102 may add one or more deny nodes 30 to the ACL rule graph 18. The one or more deny nodes 30 correspond to the blocked IP addresses from the one or more deny rules 14. In addition, the ACL compressor component 102 adds one or more deny edges 32 that connect the one or more deny nodes 30 to at least one node of the plurality of nodes 20. The one or more deny edges 32 corresponds to the minimum number of bit changes 16 between the at least one node and the one or more deny nodes 30.

The ACL compressor component 102 may determine whether a product node 28 is connected to one or more deny nodes 30 using a deny edge 32 and may compare the merged IP address of the product node 28 to the blocked IP address of the one or more deny nodes 30 in response to determining that the product node 28 is connected to the one or more deny nodes 30. The ACL compressor component 102 may prevent the product node 28 with the merged IP address from being added to the ACL rule graph 18 in response to determining that the merged IP address allows additional IP addresses included the blocked IP addresses or a subset of the blocked IP addresses. The ACL compressor component 102 may add the product node 28 with the merged IP address to the ACL rule graph 18 in response to determining that the merged IP address is not included the blocked IP addresses or a subset of the blocked IP addresses.

In some implementations, the ACL compressor component 102 verifies that the additional IP addresses belong to a same organization as an organization assigned to the allowed IP addresses in the allow rules 12. The ACL compressor component 102 may prevent the product node 28 with the merged IP address from being added to the ACL rule graph 18 in response to determining that the additional IP addresses belong to a different organization. The ACL compressor component 102 may add the product node 28 with the merged IP address to the ACL rule graph 18 in response to determining that the additional IP addresses belong the same organization.

As such, the ACL rule graph 18 may include both the allow rules 12 and the deny rules 14. Moreover, the ACL compressor component 102 may ensure that the security risk is minimized by allowing the additional IP addresses access to the applications, services, and/or machines provided by a service provider by comparing the additional IP address to the deny rules 14 and ensuring that the deny IP addresses are maintained and/or ensuring that additional IP addresses from outside of an organization are prevented from being provided access.

At 810, the method 800 includes generating a compressed ACL rule graph with the merged nodes. The merged nodes 40 may include the merged IP addresses that represent the merged allow rules. The ACL compressor component 102 may generate a compressed ACL rule graph 38 with merged nodes 40 (e.g., one or more of the produce nodes 28), any remaining nodes 20 and edges 22 from the ACL rule graph 18 that were not merged, any deny nodes 30, and/or any deny edges 32. As such, the ACL compressor component 102 may merge one or more nodes 20 and/or one or more edges 22 in the ACL rule graph 18 to generate a compressed ACL rule graph 38 while maintaining any deny rules 14.

At 812, the method 800 includes generating a reduced set of ACL rules based on the compressed ACL rule graph. The ACL compressor component 102 may generate the reduced set of ACL rules 42 based on the compressed ACL rule graph 38. The reduced set of ACL rules 42 includes fewer allow rules 44 as compared to the plurality of allow rules 12 received with the plurality of ACL rules 10. The ACL compressor component 102 may use the compressed ACL rule graph 38 to generate a reduced set of ACL rules 42. The reduced set of ACL rules 42 include allow rules 44 and deny rules 14. The allow rules 44 may be generated using the merged nodes 40 and the nodes 20 from the compressed ACL rule graph 38. The deny rules 14 are the same deny rules 14 received in the ACL rules 10 and may also be generated using the deny nodes 30 and the deny edges 32. The reduced set of ACL rules 42 is a succinct set of ACL rules consisting of allow rules 44 and the deny rules 14.

The reduced set of ACL rules 42 may be provided to a filtering component 104 to filter the network traffic received for the applications, services, and/or machines of the service provider (e.g., allowing the approved IP addresses from the allow rules 44 and blocking the IP address included in the deny rules 14). In some implementations, the filtering component 104 is implemented in a virtual filtering platform. In some implementations, the filtering component 104 is implemented in the CPU or FPGA of a device.

The method 800 may be used to merge the ACL rules 10 into a reduced subset of ACL rules 42 with a succinct set of allow rules 44 while minimizing the security risk. By reducing the ACL rules, the method 800 may reduce the ACL lookup time and may increase the number of packets processed.

Figure 9:
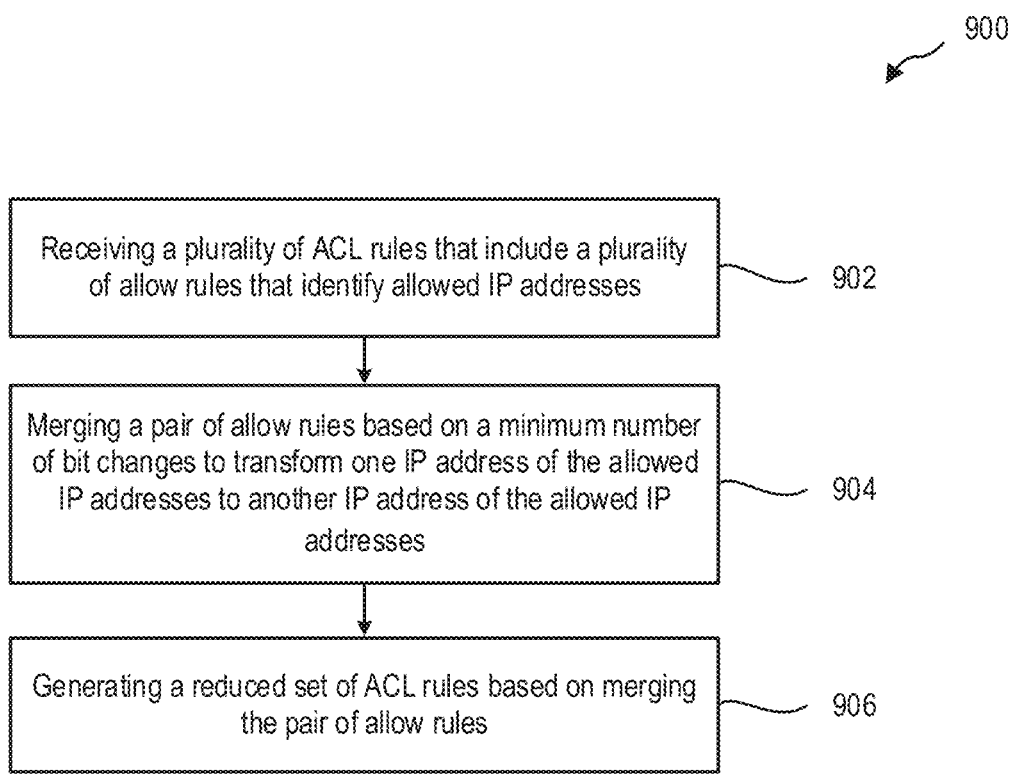
FIG. 9 illustrates an example method for reducing ACL rules in accordance with implementations of the present disclosure.

Referring now to FIG. 9, illustrated is an example method 900 for reducing ACL rules 10. The actions of the method 900 are discussed below in regard to the architecture of FIG. 1.

At 902, the method 900 includes the ACL compressor component 102 receiving a plurality of ACL rules 10 that include a plurality of allow rules 12 that identify allowed IP addresses for accessing one or more applications, services, and/or machines provided by a service provider.

At 904, the method 900 includes the ACL compressor component 102 merging a pair of allow rules based on a minimum number of bit changes 16 to transform one IP address of the allowed IP addresses to another IP address of the allowed IP addresses. The ACL compressor component 102 calculates the minimum number of bit changes 16 to transform each pair of IP addresses included in the allowed IP addresses.

The ACL compressor component 102 combines the one IP address of the allowed IP addresses to another IP address of the allowed IP addresses together into a merged IP address. The merged IP address allows additional IP addresses not included in the allowed IP addresses access to the one or more applications, services, and/or machines provided by the service provider. In some implementations, the additional IP addresses are from a same organization as an organization assigned to the allowed IP addresses.

In some implementations, the ACL compressor component 102 determines whether the additional IP addresses exceed a threshold 36. The ACL compressor component 102 prevents the merging of the pair of allow rules in response to determining that the additional IP addresses exceed the threshold. In addition, the ACL compressor component 102 allows the merging of the pair of allow rules in response to determining that the additional IP addresses are below or equal to the threshold.

At 906, the method 900 includes the ACL compressor component 102 generating a reduced set of ACL rules 42 based on merging the pair of allow rules. The reduced set of ACL rules 42 may be provided to a filtering component 104 to filter the network traffic received for the applications, services, and/or machines of the service provider (e.g., allowing the approved IP addresses from the allow rules 44 and blocking the IP address included in the deny rules 14). In some implementations, the filtering component 104 is implemented in a virtual filtering platform. In some implementations, the filtering component 104 is implemented in the CPU or FPGA of a device.

The method 900 may reduce the allow rules while allowing more IP addresses to have access to applications, services, and/or the machines provided by a service provider than the IP addresses originally included in the allow rules 12. The method 900 may open up access to additional IP addresses while minimizing a security risk of having additional IP addresses access the applications, services, and/or the machines.

Figure 10:
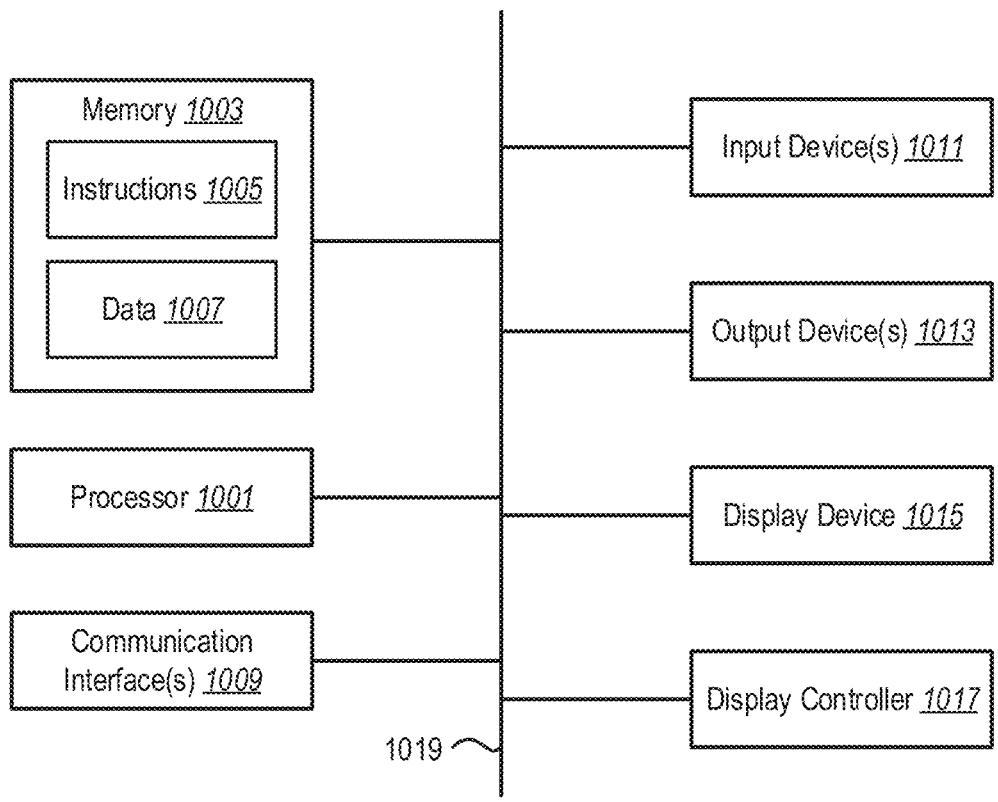
FIG. 10 illustrates components that may be included within a computer system.

FIG. 10 illustrates components that may be included within a computer system 1000. One or more computer systems 1000 may be used to implement the various methods, devices, components, and/or systems described herein.

The computer system 1000 includes a processor 1001. The processor 1001 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB) 1019, an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a transformer model, a classification model, a regression model, a language model, an object detection model) that can be tuned (e.g., trained) based on training input to approximate unknown functions. For example, a machine learning model may refer to a neural network (e.g., a transformer neural network, a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. Unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a plurality of ACL rules that include a plurality of allow rules that identify allowed IP addresses for accessing one or more applications, services, or machines provided by a service provider;
   merging a pair of allow rules based on a minimum number of bit changes to transform one IP address of the allowed IP addresses to another IP address of the allowed IP addresses;
   generating a reduced set of ACL rules based on merging the pair of allow rules; and
   filtering network traffic using the reduced set of ACL rules.

2. The method of claim 1, wherein merging the pair of allow rules further includes:
   combining the one IP address of the allowed IP addresses to the another IP address of the allowed IP addresses together into a merged IP address.

3. The method of claim 2, wherein the merged IP address allows additional IP addresses not included in the allowed IP addresses access to the one or more applications, the services, or the machines provided by the service provider.

4. The method of claim 3, wherein the additional IP addresses are from a same organization as an organization assigned to the allowed IP addresses.

5. The method of claim 3, further comprising:
   determining if the additional IP addresses exceed a threshold;
   preventing merging of the pair of allow rules in response to determining that the additional IP addresses exceed the threshold; and
   allowing merging of the pair of allow rules in response to determining that the additional IP addresses are below or equal to the threshold.

6. The method of claim 1, wherein the allowed IP addresses have access to one or more applications, services, and/or machines provided by a service provider.

7. The method of claim 1, wherein the reduced set of ACL rules includes fewer allow rules as compared to the plurality of allow rules received with the plurality of ACL rules.

8. The method of claim 1, wherein the filtering allows the network traffic to access one or more applications, services, and/or machines in response to the IP address of the network traffic matching allow rules in the reduced set of ACL rules.

9. The method of claim 1, wherein the plurality of ACL rules include deny rules identifying blocked IP addresses that are prevented from accessing one or more applications, services, and/or machines provided by a service provider.

10. The method of claim 9, wherein the filtering prevents the network traffic from accessing the one or more applications, services, and/or machines in response to IP addresses of the network traffic matching the deny rules in the reduced set of ACL rules.

11. A device, comprising:
    a memory to store data and instructions; and
    a processor operable to communicate with the memory, wherein the processor is operable to:
       receive a plurality of ACL rules that include a plurality of allow rules that identify allowed IP addresses for accessing one or more applications, services, or machines provided by a service provider;
       merge a pair of allow rules based on a minimum number of bit changes to transform one IP address of the allowed IP addresses to another IP address of the allowed IP addresses;
       generate a reduced set of ACL rules based on merging the pair of allow rules; and
       filter network traffic using the reduced set of ACL rules.

12. The device of claim 11, wherein the processor is further operable to merge the pair of allow rules by combining the one IP address of the allowed IP addresses to the another IP address of the allowed IP addresses together into a merged IP address.

13. The device of claim 12, wherein the merged IP address allows additional IP addresses not included in the allowed IP addresses access to the one or more applications, the services, or the machines provided by the service provider.

14. The device of claim 13, wherein the additional IP addresses are from a same organization as an organization assigned to the allowed IP addresses.

15. The device of claim 13, wherein the processor is further operable to:
    determine if the additional IP addresses exceed a threshold;
    prevent merging of the pair of allow rules in response to determining that the additional IP addresses exceed the threshold; and
    allow merging of the pair of allow rules in response to determining that the additional IP addresses are below or equal to the threshold.

16. The device of claim 11, wherein the allowed IP addresses have access to one or more applications, services, and/or machines provided by a service provider.

17. The device of claim 11, wherein the reduced set of ACL rules includes fewer allow rules as compared to the plurality of allow rules received with the plurality of ACL rules.

18. The device of claim 11, wherein the processor is further operable to filter the network traffic by allowing the network traffic to access one or more applications, services, and/or machines in response to the IP address of the network traffic matching allow rules in the reduced set of ACL rules.

19. The device of claim 11, wherein the plurality of ACL rules include deny rules identifying blocked IP addresses that are prevented from accessing one or more applications, services, and/or machines provided by a service provider.

20. The device of claim 19, wherein the the processor is further operable to filter the network traffic by preventing network traffic from accessing the one or more applications, services, and/or machines in response to IP addresses of the network traffic matching the deny rules in the reduced set of ACL rules.

\* \* \* \* \*